United States Patent
Westerink et al.

(10) Patent No.: US 8,336,956 B2
(45) Date of Patent: Dec. 25, 2012

(54) TABLE STOP ASSEMBLY

(75) Inventors: Rik Westerink, Corinth, TX (US); Brad Grunwald, Garland, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 141 days.

(21) Appl. No.: 12/953,187

(22) Filed: Nov. 23, 2010

(65) Prior Publication Data
US 2011/0148156 A1    Jun. 23, 2011

Related U.S. Application Data

(60) Provisional application No. 61/281,842, filed on Nov. 23, 2009.

(51) Int. Cl.
A47B 83/02 (2006.01)

(52) U.S. Cl. .............. 297/145; 297/147; 297/188.16; 108/44

(58) Field of Classification Search ........... 297/145, 297/147, 188.16; 108/44; 248/311.2
See application file for complete search history.

(56) References Cited

U.S. PATENT DOCUMENTS

| | | | |
|---|---|---|---|
| 3,583,760 A | 6/1971 | McGregor | |
| 3,632,161 A * | 1/1972 | Arfaras et al. | 297/145 |
| 4,575,149 A * | 3/1986 | Forestal et al. | 297/145 |
| 4,852,940 A | 8/1989 | Kanigowski | |
| 4,944,552 A * | 7/1990 | Harris | 297/145 |
| 5,087,096 A * | 2/1992 | Yamazaki | 297/145 |
| 5,547,247 A * | 8/1996 | Dixon | 297/145 |
| 5,927,799 A * | 7/1999 | Tornero | 297/145 |
| 6,220,658 B1 * | 4/2001 | Lukawski et al. | 297/145 |
| 6,273,502 B1 * | 8/2001 | Lo | 297/145 |
| 6,347,590 B1 * | 2/2002 | D'Annunzio et al. | 108/44 |
| 7,143,701 B2 * | 12/2006 | Lindstrom et al. | 108/44 |
| 7,216,930 B2 * | 5/2007 | Steenson | 297/145 X |
| 7,306,282 B2 * | 12/2007 | Salzer et al. | 297/145 X |
| 7,798,072 B2 * | 9/2010 | Becker et al. | 297/145 X |
| 8,109,566 B2 * | 2/2012 | Koh | 297/145 |

(Continued)

FOREIGN PATENT DOCUMENTS

EP    0930209 A    7/1999

(Continued)

OTHER PUBLICATIONS

International Search Report and Written Opinion dated Jul. 21, 2011 in related Application No. PCT/US2010/057842.

(Continued)

*Primary Examiner* — Rodney B White
(74) *Attorney, Agent, or Firm* — Dean W. Russell; Tiffany L. Williams; Kilpatrick Townsend & Stockton LLP (57) ABSTRACT

Described are table stop assemblies having a mounting block having at least one receptacle, at least one stop coupled to the receptacle, and at least one arm knuckle. The arm knuckle includes a side, a first end, and a second end, wherein the side is pivotally coupled to the mounting block, the first end is pivotally coupled to a tray table, and the second end is configured to contact the stop when the tray table is in a deployed position. As examples, the position of the stop is adjustable relative to the receptacle, and the tray table in the deployed position includes a surface that forms an angle relative to a horizontal axis that is controlled by the position of the stop.

18 Claims, 8 Drawing Sheets

U.S. PATENT DOCUMENTS

| | | | |
|---|---|---|---|
| 2005/0045071 A1* | 3/2005 | Lindstrom et al. | 108/44 |
| 2006/0220425 A1* | 10/2006 | Becker et al. | 297/188.16 |
| 2008/0250983 A1* | 10/2008 | Sundarrao | 108/44 |
| 2010/0319588 A1* | 12/2010 | Hanna et al. | 108/44 X |
| 2011/0067606 A1* | 3/2011 | Sundarrao | 108/44 |

FOREIGN PATENT DOCUMENTS

| | | |
|---|---|---|
| WO | WO-2011063399 A | 5/2011 |

OTHER PUBLICATIONS

International Preliminary Report on Patentability dated Jun. 7, 2012 in related Application No. PCT/US2010/057842.

Economy Class Passenger Seat, Photographs of Table Stop Assembly, 2 pages (Table Stop Assembly product shown in photographs known to Applicants no later than Nov. 22, 2009).

* cited by examiner

TABLE STOP ASSEMBLY

CROSS REFERENCE TO RELATED APPLICATIONS

This application is related to and claims priority benefits from U.S. Provisional Application Ser. No. 61/281,842, filed on Nov. 23, 2009, entitled FOOD TRAY STOP MECHANISM. The '842 application is hereby incorporated in its entirety by this reference.

FIELD OF THE INVENTION

The field of the invention relates to tray tables for passenger seats or the like.

BACKGROUND

Many passenger seats are equipped with a tray table for use by a passenger. Typically, the tray table is stowed either on the aft side of the passenger seat back (in front of the passenger in the next row) or inside an arm (also known as an in-arm tray table). When a passenger wishes to use the in-arm tray table, the passenger raises an arm rest cover to access the tray table, rotates the tray table from a stowed position until the tray table reaches a raised position, then rotates the tray table to a deployed position in front of the passenger.

It is desirable to have a surface of the tray table approximately level for the passenger's use. In order to achieve an approximately level surface during flight, the surface is typically aligned so that the surface tilts slightly downward in a forward direction to compensate for the nose-up attitude of the aircraft during flight. The amount of downward tilt can vary due to variations in manufactured parts and general wear and tear over time through repeated use. For example, the deployed tray table is supported by a relatively small support structure located adjacent the passenger seat arm. The repeated use of the tray table over time can result in excessive wear to the support structure and the tray table in the location where the two components contact one another during use.

Thus, it is desirable to provide a tray table design that provides for adjustment of the amount of tray table surface tilt, as well as providing a more durable and/or easily replaceable support structure at the location where the tray table contacts the support structure.

SUMMARY

Embodiments of the present invention include a table stop assembly comprising a mounting block having at least one receptacle, at least one stop coupled to the receptacle, and at least one arm knuckle. The arm knuckle includes a side, a first end, and a second end, wherein the side is pivotally coupled to the mounting block, the first end is pivotally coupled to a tray table, and the second end is configured to contact the stop when the tray table is in a deployed position. In some embodiments, the position of the stop is adjusted relative to the receptacle by rotating the stop within the receptacle.

In some embodiments, an escutcheon is configured to couple to the mounting block, wherein the escutcheon comprises an aperture positioned adjacent an outer surface of the stop. The outer surface of the stop may protrude through and extend at least some distance above the at least one aperture or may be located approximately flush with an outer end of the at least one aperture.

In some embodiments, the tray table in the deployed position comprises a surface that forms an angle relative to a horizontal axis that is controlled by the position of the stop. The table stop assembly may be incorporated into a passenger seat having an arm comprising a recess, wherein the tray table is configured to substantially fit within the recess of the arm in a stowed position.

DETAILED DESCRIPTION

Embodiments of the invention provide table stop assemblies for use with passenger seats. While the table stop assemblies are discussed for use with aircraft seats, they are by no means so limited. Rather, embodiments of the table stop assemblies may be used in passenger seats or other seats of any type or otherwise as desired.

FIGS. 1-7 illustrate one embodiment of a table stop assembly 10. The table stop assembly 10 comprises at least one stop 12 and a pivot block assembly 14.

In some embodiments, the stop 12 comprises an upper end 16 and a lower end 18. The stop 12 may be formed of materials including but not limited to aluminum, stainless steel, other metallic materials, composite materials, or other similar materials. The stop 12 has a total length of at least about 0.25 inches. In some embodiments, such as the embodiment best illustrated in FIG. 2, the lower end 18 of the stop 12 has a circular cross-sectional shape and includes multiple threads that are configured to engage a similarly threaded aperture. One of ordinary skill in the relevant art will understand that the lower end 18 may have any suitable configuration that allows the position of the stop 12 to be adjusted after it has been installed including but not limited to a bayonet or other similar mechanical fasteners.

Figure 1:
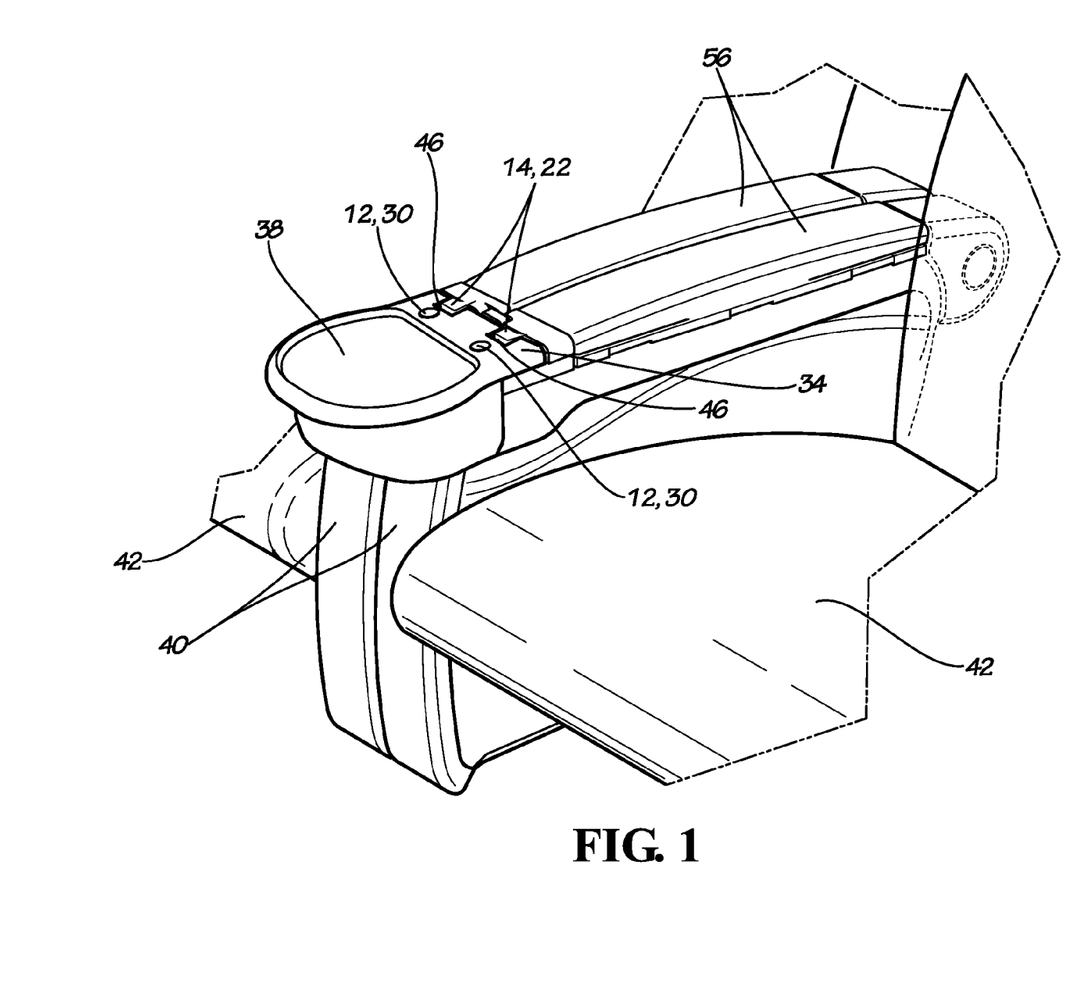
FIG. 1 is a front perspective view of a table stop assembly according to one embodiment of the present invention incorporated into a passenger seat.
Figure 2:
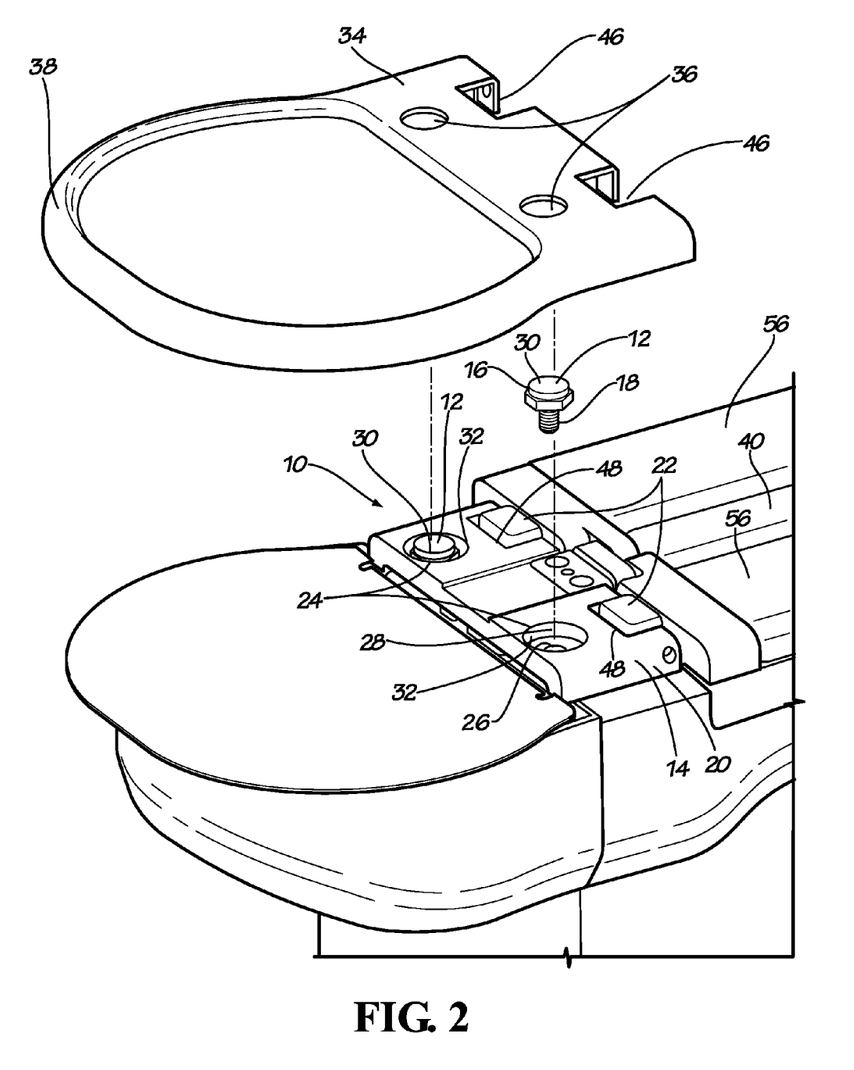
FIG. 2 is a front exploded perspective view of the table stop assembly of FIG. 1 where the tray table is in a stowed position.

In some embodiments, such as the embodiment best illustrated in FIG. 2, the upper end 16 of the stop 12 has an outer surface 30 having a circular cross-sectional shape adjacent a hexagonal shaped cross-sectional region that may be used for purposes of turning the stop 12 by hand or with a tool. Other suitable cross-sectional shapes for the upper end 16 include but are not limited to rectilinear, oval, hexagonal, octagonal, or other similar shapes. In other embodiments, the upper end 16 may comprise a circular outer cross-sectional shape and an inner recess having a suitable cross-sectional shape that may be used for purposes of turning the stop 12 by hand or with a tool. An optional plug may be coupled to the recess within the upper end 16, where the outer surface 30 is the outer surface of the plug.

In the particular embodiment shown in FIG. 2, the lower end 18 has a smaller cross-sectional shape than the upper end 16. However, one of ordinary skill in the relevant art will understand that any suitable combination of cross-sectional shapes may be used to form the stop 12. For example, the lower end 18 and the upper end 16 may have substantially identical cross-sectional shapes, so that the stop 12 has a cylindrical appearance, and the entire length of the stop 12 may include a plurality of threads or other suitable configurations that allow the position of the stop 12 to be adjusted after it has been installed.

Figure 3:
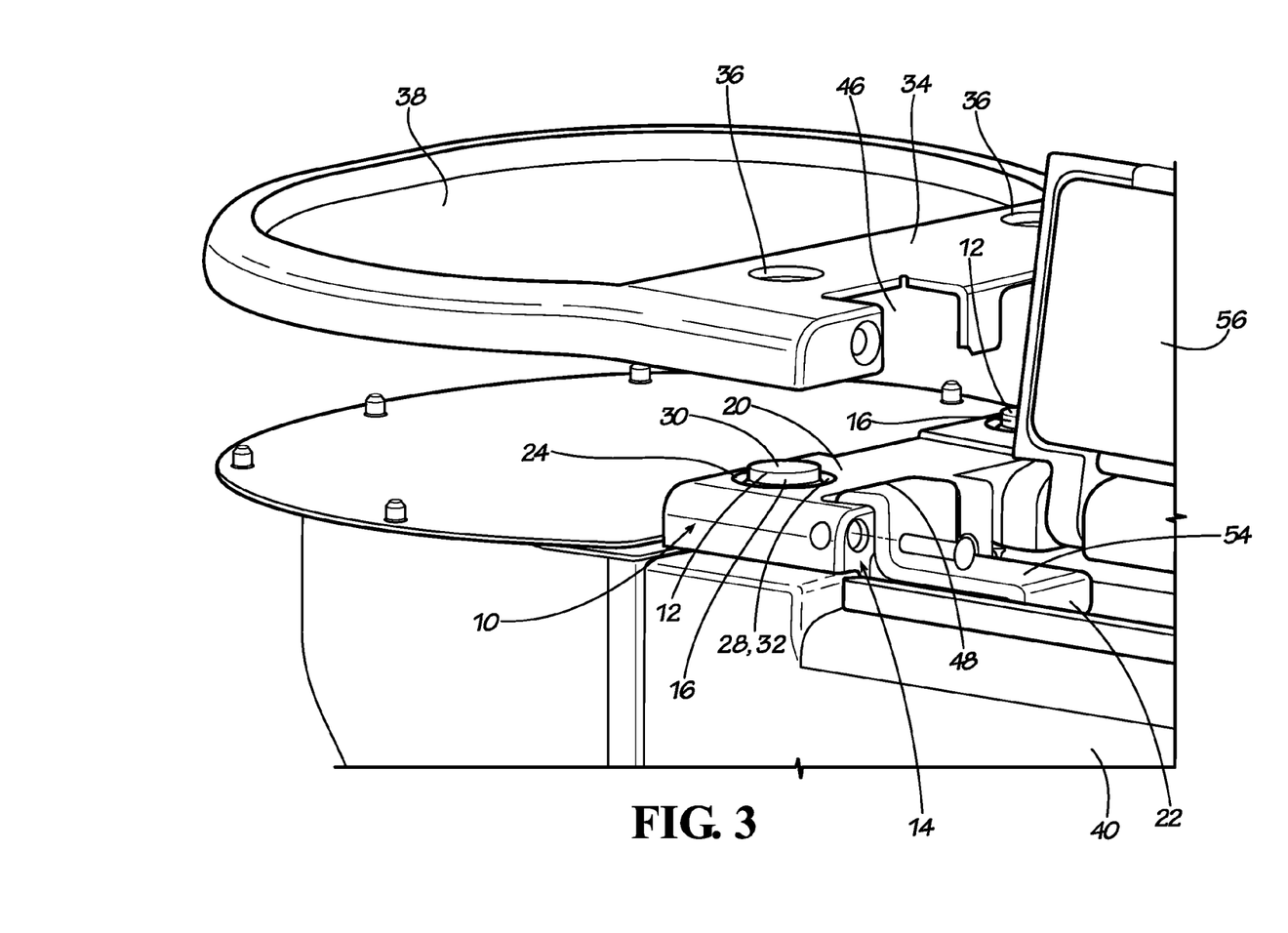
FIG. 3 is a rear exploded perspective view of the table stop assembly of FIG. 1 where the tray table is in a stowed position.
Figure 4:
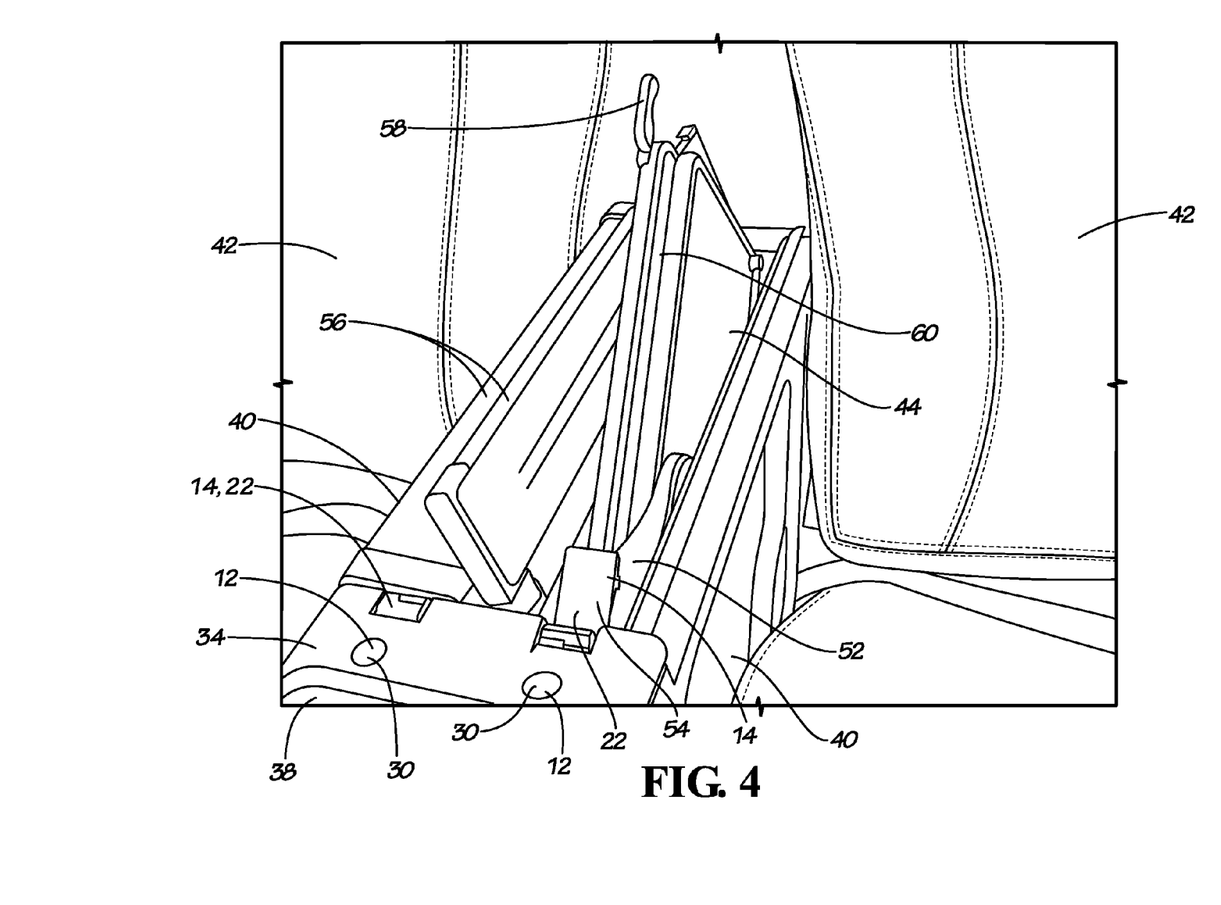
FIG. 4 is a front perspective view of the table stop assembly of FIG. 1 where the tray table is in a partially raised position.

In some embodiments, such as the embodiment best illustrated in FIGS. 2-3, the pivot block assembly 14 includes a mounting block 20 and at least one arm knuckle 22. The mounting block 20 and the arm knuckle 22 may be formed of materials including but not limited to aluminum, stainless steel, other metallic materials, composite materials, or other similar materials. In some embodiments, the mounting block 20 includes at least one receptacle 24 that is shaped to receive the stop 12.

In some embodiments, such as the embodiment best illustrated in FIG. 2, the receptacle 24 includes a recess 26 adjacent a larger opening 28. In this embodiment, the upper end 16 of the stop 12 is configured to stow within the larger opening 28. The larger opening 28 may have any suitable shape including but not limited to circular, rectilinear, oval, hexagonal, octagonal, or other similar shapes that allow the cross-sectional shape of the upper end 16 of the stop 12 to fit and rotate within the cross-sectional shape of the larger opening 28.

In the particular embodiment best illustrated in FIG. 2, the recess 26 includes multiple threads that are configured to engage the similarly-threaded lower end 18. However, one of ordinary skill in the relevant art will understand that the recess 26 may have any suitable configuration that allows the position of the stop 12 to be adjusted after it has been installed including but not limited to a bayonet receptacle or other similar mechanical fasteners.

In other embodiments, such as the embodiment where the upper end 16 comprises a recess that is shaped to allow adjustment of the position of the stop 12, the larger opening 28 and the recess 26 may have substantially identical cross-sectional shapes. In this embodiment, because the entire length of the stop 12 has a uniform cross-sectional outer shape and includes a plurality of threads or other suitable configurations, the sides of both the larger opening 28 and the recess 26 of the receptacle 24 may include a plurality of threads or other similar contouring to adjustably couple with the entire length of the stop 12.

In some embodiments, such as the embodiment shown in FIGS. 1-7, the pivot block assembly 14 includes two receptacles 24, two arm knuckles 22, and two stops 12. In other embodiments, such as the embodiment shown in FIG. 8, the pivot block assembly 14 includes one receptacle 24, one arm knuckle 22, and one stop 12. However, one of ordinary skill in the relevant art will understand that any suitable combination of receptacles 24, arm knuckles 22, and stops 12 may be used. For example, it may be suitable to provide receptacles 24 in excess of the number of stops 12 as alternative coupling locations.

In some embodiments, such as the embodiments shown in FIGS. 1-8, an escutcheon 34 is coupled to at least a substantial portion of the table stop assembly 10. In these embodiments, the escutcheon 34 is configured to provide a protective covering for at least a portion of the table stop assembly 10. The escutcheon 34 is coupled to the table stop assembly 10 via suitable mechanical fastening devices including but not limited to screws, bolts, rivets, or other similar mechanical fasteners. The escutcheon 34 is configured to prevent dirt or other debris from reaching the table stop assembly 10, as well as making the appearance of the stop assembly 10 more aesthetically pleasing and preventing passengers from tampering with the table stop assembly 10.

In some embodiments, the escutcheon 34 includes at least one aperture 36 that is adjacent the outer surface 30 of the stop 12. The number of apertures 36 included may vary depending on the number of stops 12 included and/or in use with the pivot block assembly 14. In these embodiments, the aperture 36 may have any suitable shape including but not limited to circular, rectilinear, oval, hexagonal, octagonal, or other similar shapes that allow the cross-sectional shape of the upper end 16 to extend at least partially through and rotate within the cross-sectional shape of the aperture 36 as needed.

As shown in FIGS. 1-8, the pivot block assembly 14 may be positioned adjacent at least one arm 40 of a passenger seat 42. In these embodiments, the arm 40 includes a recess that may serve as a storage location for a tray table 44. In some embodiments, such as the embodiment shown in FIGS. 1-7, the pivot block assembly 14 is positioned adjacent two arms 40 of two passenger seats 42. In other embodiments, such as the embodiment shown in FIG. 8, the pivot block assembly 14 is positioned adjacent one arm 40. One of ordinary skill in the relevant art will understand that the pivot block assembly 14 may be positioned in any appropriate manner relative to any suitable combination of arms 40. In the embodiments shown in FIGS. 1-8, the number of stops 12 and receptacles 24 provided are equal to the number of tray tables 44 adjacent the pivot block assembly 14. However, one of ordinary skill in the relevant art will understand that it may be suitable to provide additional stops 12 and receptacles 24 in excess of the number of adjacent tray tables 44 or vice versa.

In some embodiments, such as the embodiment shown in FIGS. 1-7, a cocktail tray 38 is coupled to a forward end of the escutcheon 34. In other embodiments, such as the embodiment shown in FIG. 8, the forward end of the escutcheon 34 is shaped to substantially contour to a forward end of the arm 40. In yet other embodiments, the forward end of the escutcheon 34 may be coupled to a control unit, a cup holder, an ash tray, or other suitable object.

The escutcheon 34 may also include at least one aperture 46 to provide a location for the arm knuckle 22 to pivotally couple to the mounting block 20. The number of apertures 46 included may vary depending on the number of arm knuckles 22 included and/or in use with the pivot block assembly 14. In these embodiments, such as the embodiment best illustrated in FIGS. 2-3, the arm knuckle 22 is pivotally coupled to a side 48 of the mounting block 20 and adjacent the receptacle 24 via suitable mechanical fastening devices including but not limited to screws, bolts, rivets, or other similar mechanical fasteners. A first end 50 of the arm knuckle 22 is configured to also pivotally couple to an extension 52 of the tray table 44 via suitable mechanical fastening devices including but not limited to screws, bolts, rivets, or other similar mechanical fasteners. In some embodiments, such as the embodiments best shown in FIGS. 5-8, the extension 52 has a rectilinear cross-sectional shape in the region that couples to the arm knuckle 22. In these embodiments, the first end 50 of the arm knuckle 22 also has a rectilinear cross-sectional shape. Other suitable shapes include but are not limited to rectilinear, oval, hexagonal, octagonal, or other similar shapes. However, one of ordinary skill in the relevant art will understand that any suitable shape may be used for the cross-sectional shape of the first end 50 so long as it allows the tray table 44 to pivotally couple to the arm knuckle 22 and pivot from a stowed position inside the arm 40 (as shown in FIGS. 2-3) to a deployed position (as shown in FIG. 7).

Figure 5:
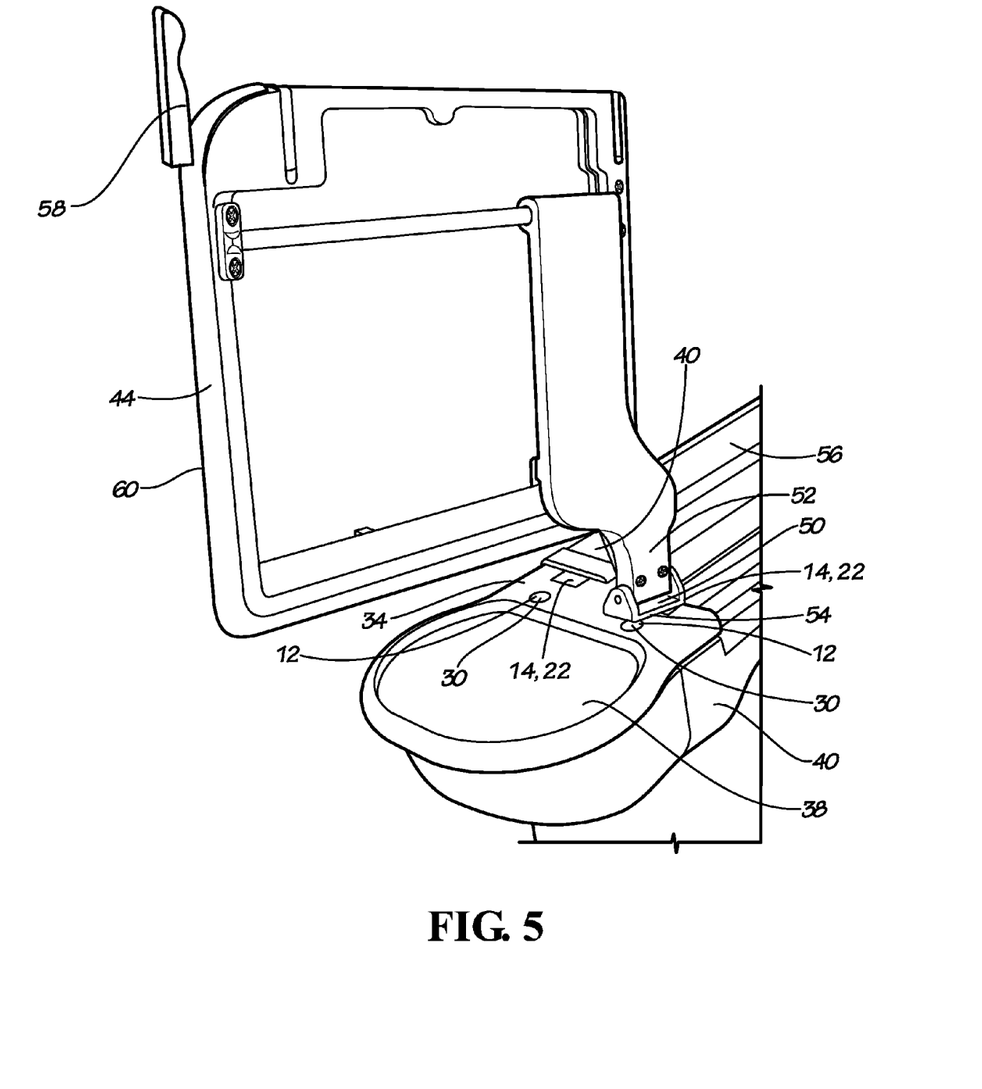
FIG. 5 is a front perspective view of the table stop assembly of FIG. 1 where the tray table is in a raised position.
Figure 6:
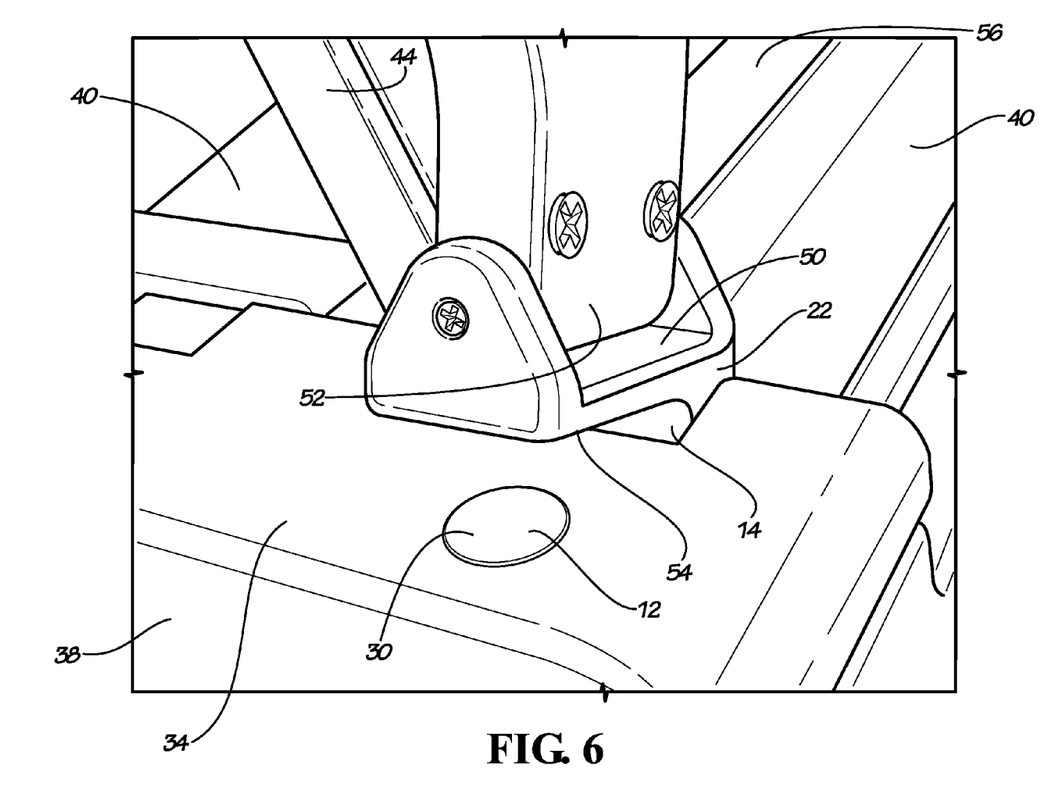
FIG. 6 is a partial front perspective view of the table stop assembly of FIG. 5.
Figure 7:
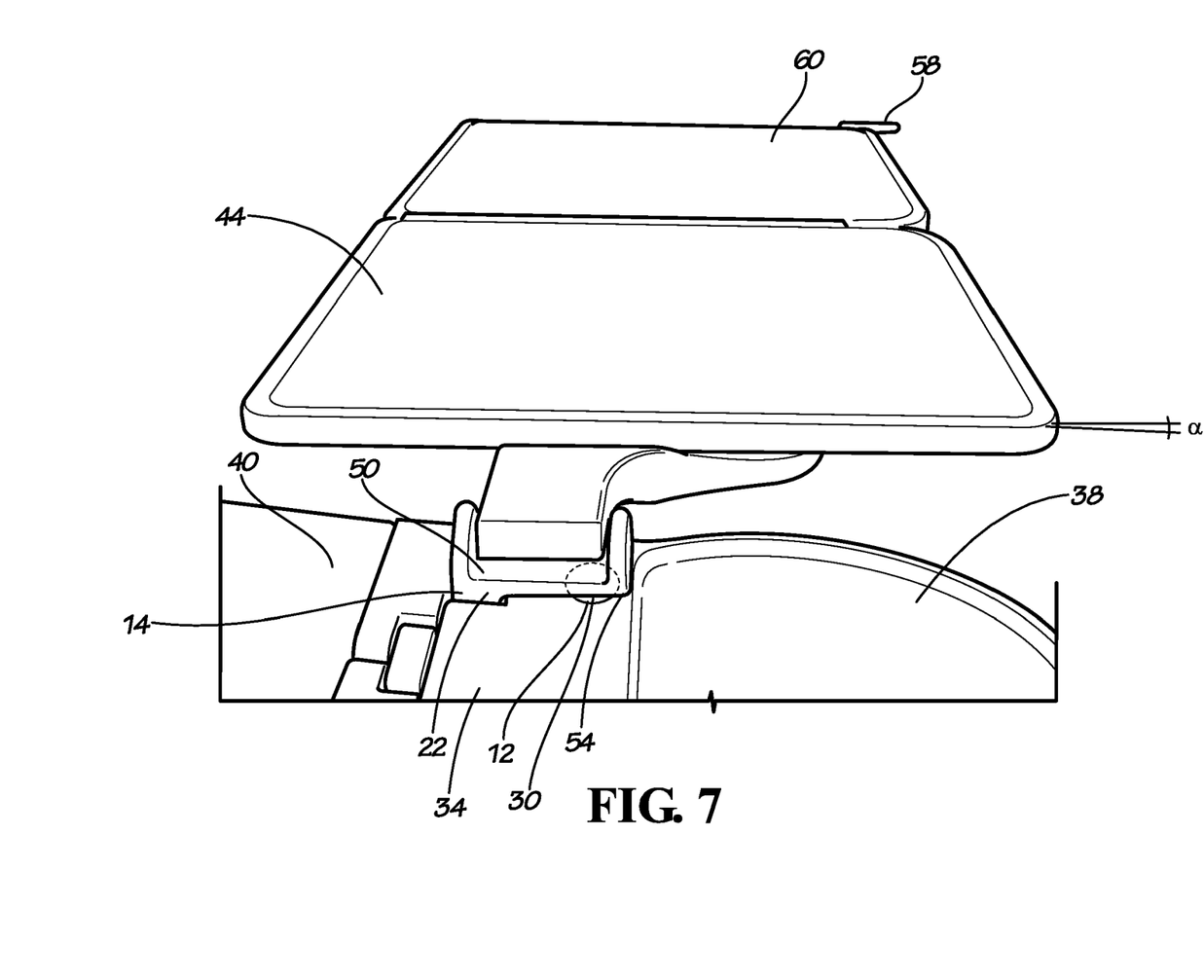
FIG. 7 is a side perspective view of the table stop assembly of FIG. 1 where the tray table is in a deployed position.
Figure 8:
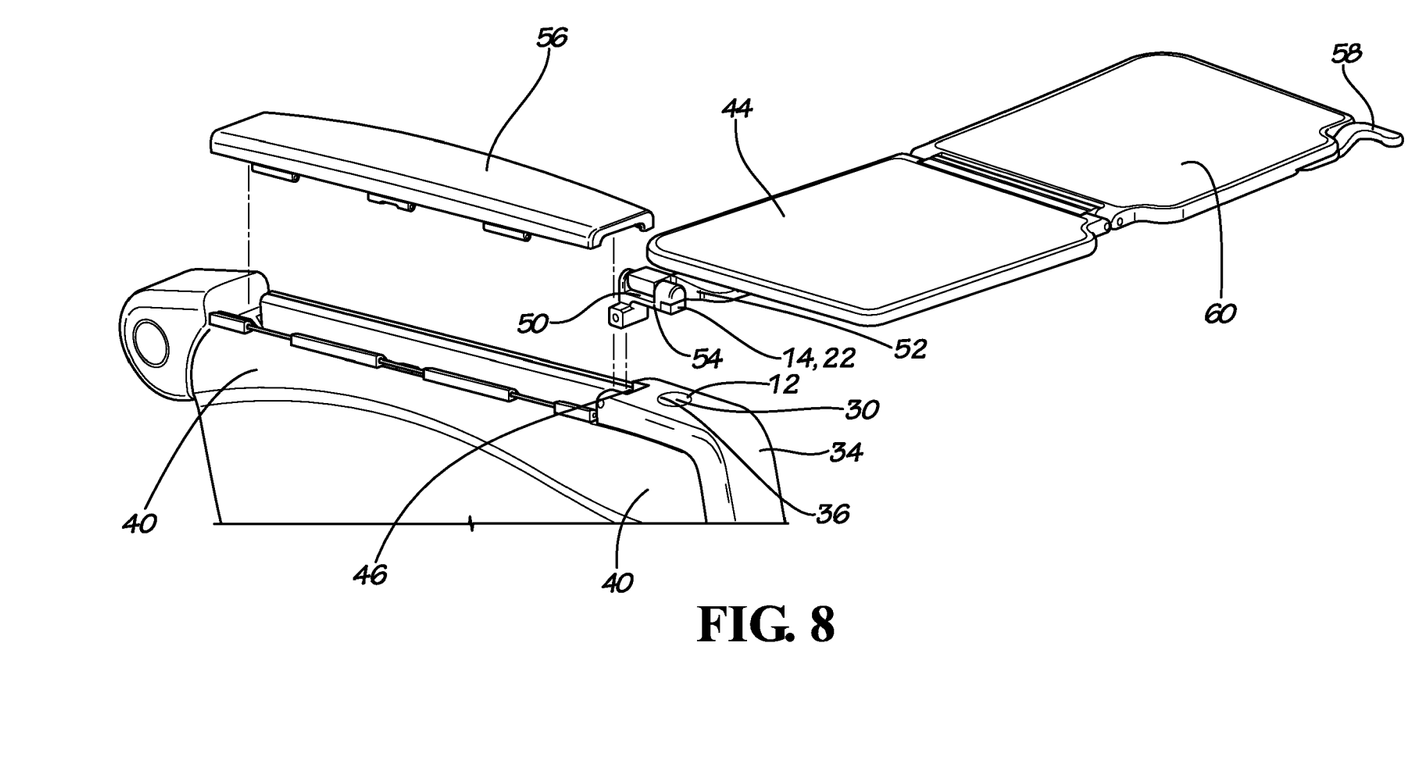
FIG. 8 is an exploded perspective view of a table stop assembly according to an alternative embodiment of the present invention incorporated into a passenger seat.

The arm knuckle 22 also includes a second end 54 that is configured to contact the outer surface 30 of the stop 12 when the tray table 44 is in a raised position (as shown in FIGS. 5-6) and a deployed position (as shown in FIG. 7). In some embodiments, such as the embodiments shown in FIGS. 1-8, the second end 54 has a rectangular cross-sectional shape that is substantially identical to the cross-sectional shape of the first end 50. Other suitable cross-sectional shapes include but are not limited to rectilinear, oval, hexagonal, octagonal, or other similar shapes. In some embodiments, the second end 54 may have a cross-sectional shape that substantially corresponds to the cross-sectional shape of the outer surface 30 of the stop 12. In other embodiments, the second end 54 has any suitable cross-sectional shape that contacts the outer surface 30.

In some embodiments, it may be desirable to form both the outer surface 30 of the stop 12 and the arm knuckle 22 of a more durable material, such as stainless steel or aluminum, so that the materials will withstand extensive and repeated use over time. However, in other embodiments, one or both parts may be formed of less expensive and/or lighter materials due to other considerations. In any event, by substituting the outer surface 30 of the stop 12 in place of the escutcheon 34 material in the area that contacts the second end 54, the stop 12 becomes a more easily replaceable wear part that does not require replacement of the entire escutcheon 34.

In other alternative embodiments, an adjustable protrusion may be incorporated into the second end 54 of the arm knuckle 22, so that the stop 12 then serves as a stationary coupling surface. In yet other alternative embodiments, it may be desirable to incorporate an adjustable protrusion into the second end 54 of the arm knuckle 22 and maintain the adjustable design of the stop 12. In still yet other alternative embodiments, it may desirable to incorporate a stationary protrusion into the second end 54 of the arm knuckle 22 that couples with the adjustable surface of the stop 12.

In use, the tray table 44 is deployed from the stowed position (as shown in FIGS. 2-3) by first lifting an arm rest cover 56 to access the tray table 44. In some embodiments, such as the embodiment best shown in FIG. 4, a hook 58 is provided to better enable a passenger to grip the tray table 44 in the stowed position (as shown in FIGS. 2-3). The passenger then rotates the tray table 44 from the stowed position to the raised position (as shown in FIGS. 5-6) via the pivotal coupling between the arm knuckle 22 and the mounting block 20. When the tray table 44 reaches the raised position, the second end 54 of the arm knuckle 22 contacts the outer surface 30 of the stop 12. The passenger then rotates the tray table 44 to the deployed position (as shown in FIG. 7) via the pivotal coupling between the arm knuckle 22 and the extension 52.

Once the tray table 44 reaches the deployed position, it is desirable to have a surface 60 of the tray table 44 form a desired angle $\alpha$ relative to a horizontal axis. Typically, the desired angle $\alpha$ is based on the amount of angle needed to compensate for the flight angle or nose-up attitude of the aircraft so that the surface 60 is approximately level for the passenger's use during flight. However, the stop assembly 10 is configured so that any suitable angle $\alpha$ may be achieved based on the preference of the particular aircraft and/or the purpose of the tray table 44. For example, the tray table 44 may serve as a support surface for a book or other reading materials, which may require a different angle $\alpha$ than when the tray table 44 is used as a work surface or an eating surface. Also, different aircraft may utilize different flight angles, thus changing the amount of angle $\alpha$ needed to achieve an approximately level surface 60 for the passenger's use during flight. For the specific embodiment where the tray table 44 is desired to be used as a level surface 60 and the aircraft's flight angle is approximately 3 degrees (as shown in FIG. 7), the desired angle $\alpha$ is approximately 3 degrees from a horizontal axis, but this is but one exemplary embodiment. One of ordinary skill in the relevant art will understand that any suitable angle $\alpha$ may be used.

In some embodiments, in order to achieve the desired angle $\alpha$, the stop 12 may be adjusted over a range of positions. For example, the stop 12 may be positioned so that the outer surface 30 protrudes through and extends at least some distance above the aperture 36 of the escutcheon 34 as needed. Alternatively, stop 12 may be positioned so that the outer surface 30 is approximately flush with an outer end of the aperture 36 of the escutcheon 34. In the embodiments where the arm knuckle 22 includes a protrusion (stationary or adjustable), the stop 12 may be positioned so that the outer surface 30 is below an outer end of the aperture 36 of the escutcheon 34. In other embodiments, the stop 12 may include a tread-locking mechanism that is designed to maintain the stop 12 in the desired position. A technician or member of the flight crew may adjust the position of the stop 12 as needed either during initial installation or following a period of use.

To adjust during initial installation, the technician may use his or her hand or a tool, such as a wrench or screwdriver depending on the design of the upper end 16, to adjust the position of the stop 12 until the desired angle $\alpha$ is achieved. Once the desired position of the stop 12 is achieved, the technician then couples the escutcheon 34 to the table stop assembly 10.

To adjust as needed following a period of use, the technician may need to remove the escutcheon 34 to access the table stop assembly 10. The technician then uses his or her hand or a tool as described above to adjust the position of the stop 12 until the desired angle $\alpha$ is achieved. Once the desired position of the stop 12 is achieved, the technician then re-couples the escutcheon 34 to the table stop assembly 10. In some embodiments where the stop 12 is adjustable via a recess located within the upper end 16, it may not be necessary to remove the escutcheon 34 to perform the adjustment.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A table stop assembly comprising:
   (a) a mounting block comprising at least one receptacle and positioned adjacent an arm of a passenger seat so that the mounting block does not rotate relative to the arm;
   (b) at least one stop comprising a lower end and an upper end, wherein the lower end comprises a threaded surface coupled to the at least one receptacle and the upper end comprises an outer surface adjacent a polygonal shaped cross-sectional region used for turning the at least one stop by hand or with a tool, wherein a position of the at least one stop within the at least one receptacle is adjustable via rotation of the polygonal shaped cross-sectional region, and the polygonal shaped cross-sectional region is substantially hidden from view; and (c) at least one arm knuckle comprising a side, a first end, and a second end, wherein the side is pivotally coupled to the mounting block, the first end is pivotally coupled to a tray table, and the second end is configured to contact the outer surface of the at least one stop when the tray table is in a deployed position.

2. The table stop assembly of claim 1, further comprising an escutcheon that is configured to couple to the mounting block, wherein the escutcheon comprises at least one aperture positioned adjacent the outer surface of the at least one stop.

3. The table stop assembly of claim 2, wherein the outer surface of the at least one stop protrudes through and extends at least some distance above the at least one aperture.

4. The table stop assembly of claim 2, wherein the outer surface of the at least one stop is located approximately flush with an outer end of the at least one aperture.

5. The table stop assembly of claim 1, wherein the at least one stop is formed of stainless steel.

6. The table stop assembly of claim 1, wherein the at least one arm knuckle is formed of stainless steel.

7. The table stop assembly of claim 1, wherein the tray table in the deployed position comprises a surface that forms an angle relative to a horizontal axis that is controlled by the position of the at least one stop.

8. A passenger seat comprising:
   (a) at least one arm comprising a recess;
   (b) a tray table configured to substantially fit within the recess of the at least one arm in a stowed position;
   (c) a mounting block comprising at least one receptacle and positioned adjacent the at least one arm so that the mounting block does not rotate relative to the at least one arm;
   (d) at least one stop comprising a lower end and an upper end, wherein the lower end comprises a threaded surface coupled to the at least one receptacle and the upper end comprises an outer surface adjacent a polygonal shaped cross-sectional region used for turning the at least one stop by hand or with a tool, wherein a position of the at least one stop within the at least one receptacle is adjustable via rotation of the polygonal shaped cross-sectional region, and the polygonal shaped cross-sectional region is substantially hidden from view; and
   (e) at least one arm knuckle comprising a side, a first end, and a second end, wherein the side is pivotally coupled to the mounting block, the first end is pivotally coupled to the tray table, and the second end is configured to contact the outer surface of the at least one stop when the tray table is in a deployed position.

9. The passenger seat of claim 8, wherein the at least one stop is formed of stainless steel.

10. The passenger seat of claim 8, wherein the at least one arm knuckle is formed of stainless steel.

11. The passenger seat of claim 8, wherein the tray table in the deployed position comprises a surface that forms an angle relative to a horizontal axis that is controlled by the position of the at least one stop.

12. The passenger seat of claim 8, further comprising an escutcheon that is configured to couple to the mounting block, wherein the escutcheon comprises at least one aperture positioned adjacent the outer surface of the at least one stop.

13. The passenger seat of claim 12, wherein the outer surface of the at least one stop protrudes through and extends at least some distance above the at least one aperture.

14. The passenger seat of claim 12, wherein the outer surface of the at least one stop is located approximately flush with an outer end of the at least one aperture.

15. A method of adjusting a table stop assembly, wherein the table stop assembly comprises a mounting block comprising at least one receptacle and positioned adjacent an arm of a passenger seat so that the mounting block does not rotate relative to the arm, at least one stop comprising a lower end and an upper end, wherein the lower end comprises a threaded surface coupled to the at least one receptacle and the upper end comprises an outer surface adjacent and a polygonal shaped cross-sectional region used for turning the at least one stop by hand or with a tool, and a tray table pivotally coupled to the mounting block, the steps comprising:
   (a) rotating the polygonal shaped cross-sectional region of the at least one stop to adjust a position of the at least one stop within the at least one receptacle; and
   (b) coupling an escutcheon to the mounting block, wherein the escutcheon comprises at least one aperture positioned adjacent the outer surface of the at least one stop so that the outer surface is visible and the polygonal shaped cross-sectional region is substantially hidden from view.

16. The method of claim 15, wherein the outer surface of the at least one stop protrudes through and extends at least some distance above the at least one aperture.

17. The method of claim 15, wherein the outer surface of the at least one stop is located approximately flush with an outer end of the at least one aperture.

18. The method of claim 15, further comprising the step of rotating the tray table from a stowed position to a deployed position, wherein the tray table in the deployed position comprises a surface that forms an angle relative to a horizontal axis that is controlled by the position of the at least one stop.

* * * * *